UNITED STATES PATENT OFFICE.

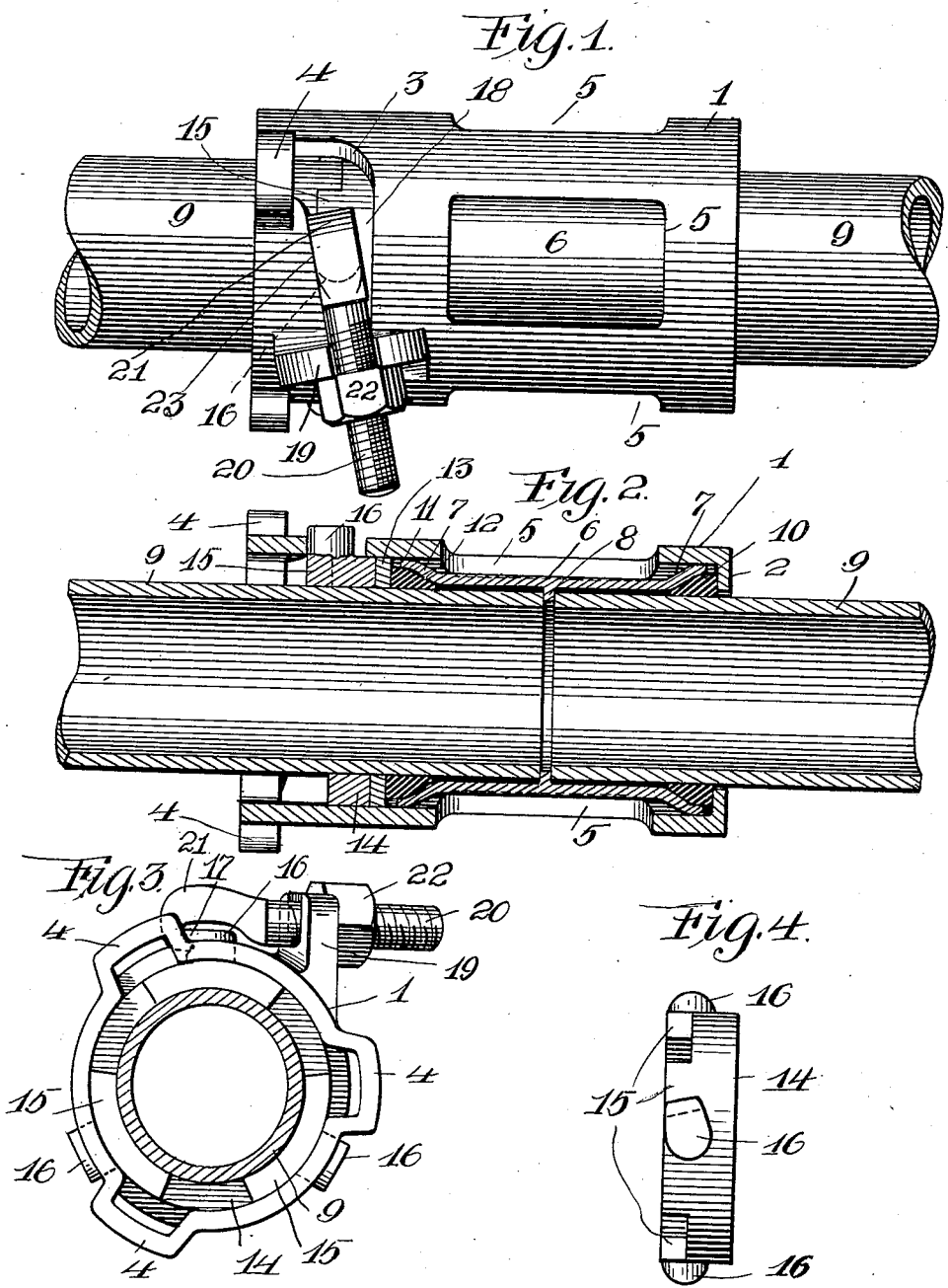

FORSTER ROBINSON, OF CASEY, ILLINOIS, ASSIGNOR, BY MESNE ASSIGNMENTS, TO THE U. C. COUPLING COMPANY, OF COLUMBUS, OHIO.

PIPE-COUPLING.

991,891.

Specification of Letters Patent.

Patented May 9, 1911.

Application filed July 16, 1910. Serial No. 572,344.

*To all whom it may concern:*

Be it known that I, FORSTER ROBINSON, a citizen of the United States of America, residing at Casey, in the county of Clark and State of Illinois, have invented certain new and useful Improvements in Pipe-Couplings, of which the following is a specification, reference being had therein to the accompanying drawing.

This invention is an improvement on my pipe coupling for which I obtained Patent No. 799,497 dated September 12, 1905, and an application filed December 30, 1909, Serial No. 535,681.

The present invention aims to simplify the construction that I have heretofore used, and to provide a more durable and easily operated pipe coupling.

With the above and such other objects in view as may hereinafter appear, the invention consists of the novel construction, combination and arrangement of parts to be hereinafter specifically described and then claimed.

Reference will now be had to the drawing, wherein:—

Figure 1 is a plan of the pipe coupling, Fig. 2 is a longitudinal sectional view of the same, Fig. 3 is an end view of the coupling, and Fig. 4 is a side elevation of a locking ring forming part of the coupling.

A pipe coupling in accordance with this invention comprises a sleeve 1 having one end thereof provided with an inwardly projecting annular flange 2, and the opposite end thereof is provided with a plurality of bayonet-shaped slots 3, said slots having the open ends thereof bridged by straps 4 employed for adding rigidity and strength to the slotted end of the sleeve. The sleeve intermediate the ends thereof is provided with a plurality of oblong openings 5 to reduce the weight of the sleeve and save material without imparting the strength of the same.

Arranged in the sleeve is a cylindrical coupling member 6 having the ends thereof flared, as at 7 and intermediate the flared ends provided with an annular interior rib 8 serving functionally as a stop for the ends of pipes 9 adapted to be connected by the coupling. Surrounding the pipes 9 within the sleeve 1 are annular resilient gaskets 10 and 11, these gaskets being preferably made of rubber and provided with beveled edges 12 to enter the flared ends 7 of the cylindrical coupling member 6. The gasket 10 is interposed between the end of the coupling member 6 and the annular flange 2, and the gasket 11 is interposed between the opposite end of the member 6 and a wearing ring 13 surrounding the pipe 9 adjacent to the slots 3 of the sleeve 1. Engaging the wearing ring 13 is a locking ring 14, said ring having the outer edge thereof provided with a plurality of equally spaced lugs 15, and each lug supports a radially disposed pin 16. One of said pins is cut away to form a lip 17, the purpose of which will presently appear.

Mounted upon the sleeve 1 at the closed angular end 18 of one of the bayonet-shaped slots 3 are lugs 19, and adjustably mounted between said lugs is a screw 20 having one end thereof provided with a hook 21 to engage the lip 17 of one of the pins 16, and upon the opposite end of the screw is rotatably mounted a nut 22.

After the pipes 9, gaskets 10 and 11, coupling member 6 and the wearing ring 13 have been assembled in the sleeve 1, the locking ring 14 is placed in the end of the sleeve 1 with the pins 16 thereof riding into the slots 3. After the pins have entered the slots, the hook 21 of the screw 20 is placed in engagement with the lip 17 and the nut 22 rotated against the lugs 19 to draw the pins 16 into the bayonet-shaped slots. As the pins 16 ride against the angular sides 23 of the slots 3, the locking ring 14 will be forced inwardly against the wearing ring 13, this ring against the gasket 11, thereby forcing the coupling member 6 against the gasket 10 and said gasket against the flange 2, binding all of said parts within the sleeve 1 and compressing the gaskets to that extent that a water-tight connection is formed between said gaskets and the pipes 9.

The locking ring 14 is provided with the lugs 15 whereby the pins thereof will be correctly positioned relatively to the bayonet-shaped slots 3, allowing the pins 16 to ride against the angular sides 23 of said slots.

The wearing ring 13 is employed to prevent the locking ring 14 from injuring the gasket 11 when said locking ring is adjusted.

What I claim is:—

1. In a pipe coupling, the combination with the confronting ends of two pipes, of a sleeve embracing the confronting ends of said pipes, an inwardly projecting annular flange carried by one end of said sleeve, the opposite end of said sleeve having bayonet-shaped slots formed therein, straps bridging the open ends of said slots, a cylindrical coupling member arranged within said sleeve and having the ends thereof flared, an annular interior rib carried by said member and serving functionally as a stop for the ends of said pipes, gaskets surrounding said pipes and extending into the flared ends of said member, a wearing ring against one of said gaskets, a locking ring engaging said wearing ring, radially disposed pins carried by said locking ring and adapted to ride into said slots and against the angular sides of said slots, lugs mounted upon one end of said sleeve, and means detachably mounted between said lugs and adapted to engage one of said pins for shifting said pins toward the closed ends of said slots.

2. In a pipe coupling, the combination with the confronting ends of two pipes, of a sleeve embracing the confronting ends of said pipes, an inwardly projecting annular flange carried by one end of said sleeve, the opposite end of said sleeve having bayonet-shaped slots formed therein, straps bridging the open ends of said slots, a cylindrical coupling member arranged within said sleeve and having the ends thereof flared, an annular interior rib carried by said member and serving functionally as a stop for the ends of said pipes, gaskets surrounding said pipes and extending into the flared ends of said member, a wearing ring against one of said gaskets, a locking ring engaging said wearing ring, radially disposed pins carried by said locking ring and adapted to ride into said slots and against the angular sides of said slots, lugs mounted upon one end of said sleeve, means detachably mounted between said lugs and adapted to engage one of said pins for shifting said pins toward the closed ends of said slots, said means including a screw, a hook carried by one end of said screw and adapted to engage one of said pins, and a nut screwed upon the other end of said screw.

3. In a pipe coupling, the combination with the confronting ends of two pipes, of a sleeve embracing the ends of said pipes, an inwardly projecting annular flange carried by one end of said sleeve, the opposite end of said sleeve having bayonet-shaped slots formed therein, a cylindrical coupling member arranged within said sleeve and having the ends thereof flared, gaskets surrounding said pipes and extending into the flared ends of said member, a locking ring adapted to retain said gaskets in engagement with said locking member and said pipes, radially disposed pins carried by said ring and adapted to ride into said slots and against the angular sides thereof, and means mounted upon one end of said sleeve and adapted to engage one of said pins for shifting said pins toward the closed ends of said slots.

In testimony whereof I affix my signature in the presence of two witnesses.

FORSTER ROBINSON.

Witnesses:
C. W. KIRKWOOD,
A. L. HARRIS.

Copies of this patent may be obtained for five cents each, by addressing the "Commissioner of Patents Washington, D. C."